G. N. SHEPARDSON.
WINDOW FOR VEHICLE CURTAINS.
APPLICATION FILED JAN. 2, 1919.
1,318,234.
Patented Oct. 7, 1919.
2 SHEETS—SHEET 1.
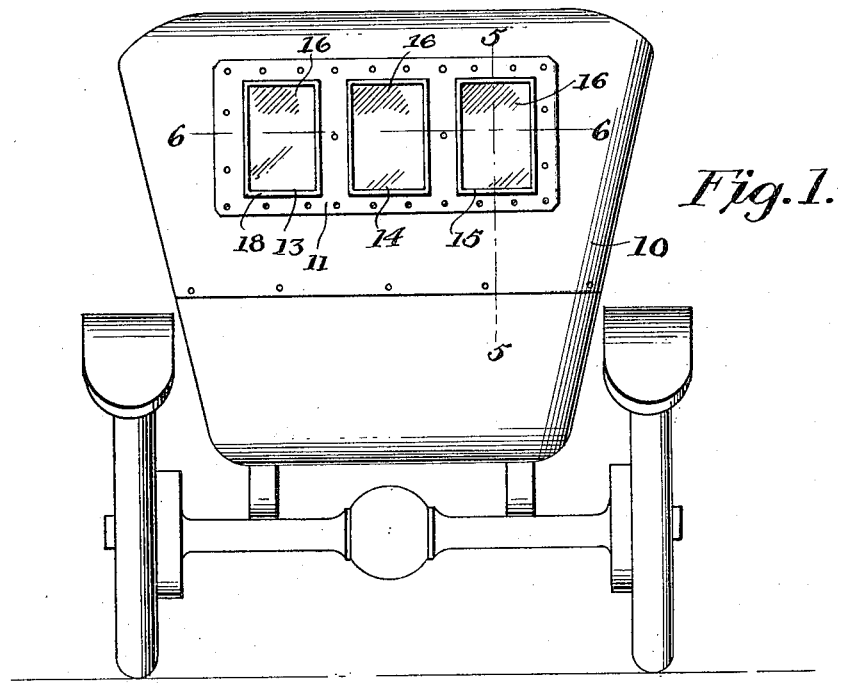
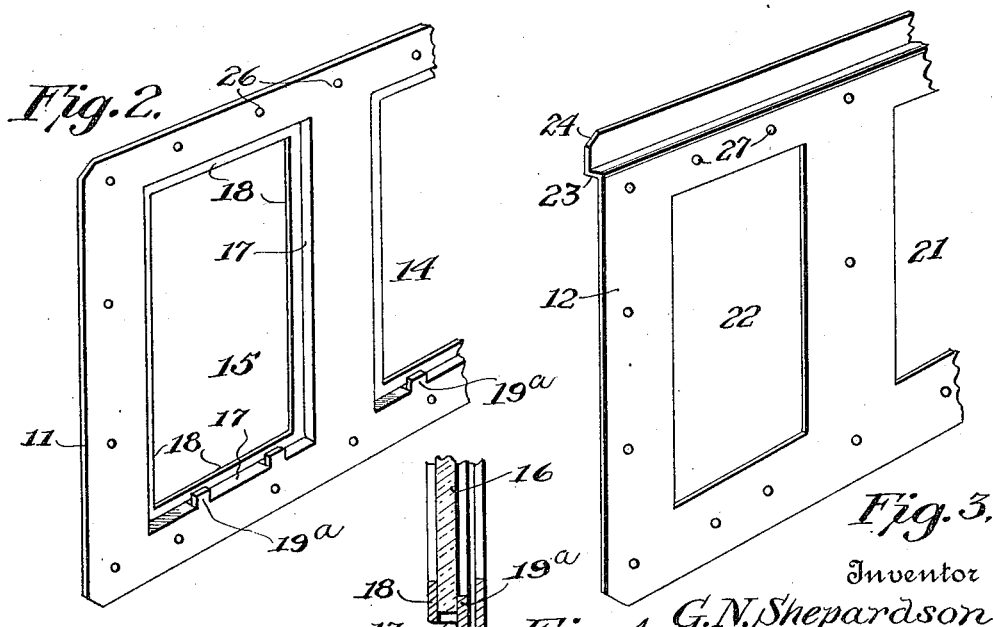
Witnesses
Inventor
G. N. Shepardson
By
Attorney

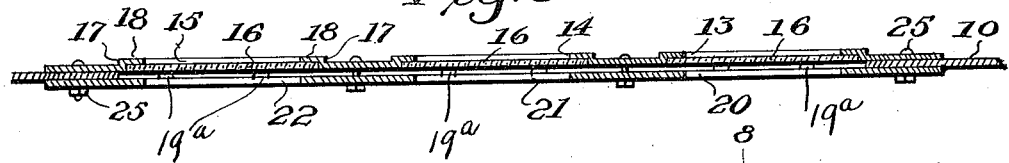
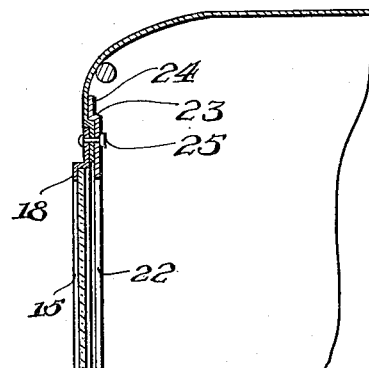
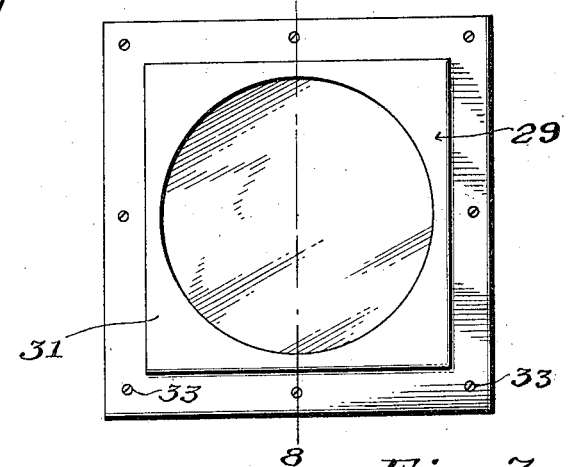
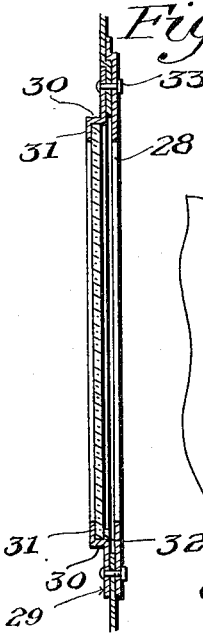
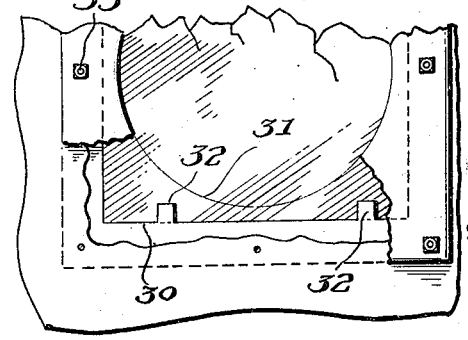

UNITED STATES PATENT OFFICE.

GEORGE N. SHEPARDSON, OF MEMPHIS, TENNESSEE.

WINDOW FOR VEHICLE-CURTAINS.

1,318,234. Specification of Letters Patent. Patented Oct. 7, 1919.

Application filed January 2, 1919. Serial No. 269,265.

*To all whom it may concern:*

Be it known that I, GEORGE N. SHEPARDSON, a citizen of the United States of America, and resident of Memphis, in the county of Shelby and State of Tennessee, have invented certain new and useful Improvements in Windows for Vehicle-Curtains, of which the following is a specification.

This invention relates to glazing for vehicle curtains and particularly to those used on automobile tops, the said invention having for an object the provision of novel means whereby glass plates may be held in openings in automobile curtains without liability of rattling or breaking.

A still further object of this invention is to provide novel means whereby glass plates may be applied to automobile curtains which have had celluloid panes, especially where the curtains at the edges of the opening have become impaired or frayed, it having been found in practice that the invention not only serves as a binder for the said edges but reinforces the material to such an extent as to prevent further tearing while, at the same time, the said device affords a support or housing for glass panes which may be substituted for the celluloid glazing now so commonly employed in curtains of automobiles, and while the device is of prime importance as a substituting medium in this class of devices, it is also capable of use in the production of new jobs.

A further object of this invention is to provide a glass window for curtains which can be readily applied or installed without removing the curtain, and economically, since the invention comprises comparatively few, inexpensive parts of simple construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the rear of an automobile showing the invention installed in the drop curtain thereof;

Fig. 2 illustrates a perspective view of a fragment of one of the clamping plates or frames;

Fig. 3 illustrates a perspective view of a fragment of the companion clamping plate or frame;

Fig. 4 illustrates a section of a fragment of the frames assembled;

Fig. 5 illustrates a vertical sectional view on the line 5—5 of Fig. 1;

Fig. 6 illustrates a horizontal sectional view on the line 6—6 of Fig. 1;

Fig. 7 illustrates a view in elevation of a fragment of a drop curtain with a glass holder of modified construction applied thereto;

Fig. 8 illustrates a sectional view on the line 8—8 of Fig. 7; and

Fig. 9 illustrates a view in elevation of a fragment of the frame shown in Fig. 8 from the side opposite that shown in Fig. 7.

In these drawings 10 denotes a drop curtain of an automobile top to which, as has been stated, the glass holding frame is applied, and the said glass holding frame or plate comprises an outer frame 11 and an inner frame 12, each preferably formed of a single piece of metal by stamping the metal and forming window openings therein, as will presently appear.

The frame 11, as will be seen from an inspection of the drawing, has openings 13, 14, and 15, which are intended to be closed by panes 16 of glass and while I have shown a frame having provision for three panes of glass, it is to be understood that the number may be increased or diminished according to requirements. In each instance, however, the provision for holding the pane of glass in each opening will be the same and a description of the instrumentalities employed in connection with one opening will suffice as a disclosure for those of the other openings and they are as follows: viz: the material around the edge of each opening is struck up or otherwise shaped to produce outwardly extending flanges 17, one of which extends along each edge of the opening and these flanges 17 constitute what might be termed shoulders which are abutted by the edges of the panes of glass so as to confine the glass against vertical or lateral movement and the material comprising the frame is also further shaped to produce flanges 18, each of which is a continuation of a flange 17, so that the pane of glass 16 will be seated in the recess formed by the outwardly extending flange and it will be held therein by the flange which extends on a plane parallel to the plane of the frame.

In order to create a seat for the bottom edge of the pane of glass and prevent its dislodgment while the parts are being assembled, and thereafter ears 19ª are struck from the lower flange 17 and when the frame is in place, the said ears stand vertically with the lower edge of the glass lying between the ears and the lower flange 18, as shown fully in Fig. 4. As thus shown, the lower edge of the glass is seated in such a manner as to prevent its dislodgment, as stated, and the work of assembling the parts of the device may be expedited, and the glass will be held secured thereto.

The frame 12 coacts with the frame 11, as heretofore explained, and it has apertures 20, 21 and 22 which correspond and register with the apertures 13, 14 and 15 respectively to provide light openings guarded by the panes of glass, and in order to give a finished effect and provide for the proper shedding of water which might run down the curtain, the frame 12 is provided with an outwardly extending flange 23 and an upwardly extending flange 24, which forms a continuation of the outwardly extending flange and when the frame 12 is applied to the interior of the drop curtain and the frame 11 is applied to the exterior of the curtain and pressed toward each other, the curtain at the edge of the opening to which the frames are applied will be pressed against the flange 24 and under the flange 23 to such an extent as to cause the frame 11 to practically aline with the outer surface of the curtain which has been pressed against the flange 24 so that water coming down the curtain will follow on down over the frame and escape without to any appreciable extent percolating in the joint or between the outer frame 11 and the curtain. This arrangement furthermore increases the frictional engagement of the frame sections and curtain and assists in retaining the parts in assembled relation.

As a means for forcing the frame sections toward each other and clamping the curtain therebetween I may employ and preferably do employ bolts 25 having slotted heads, although I do not wish to be restricted to the particular form of clamping member employed, it being understood that these clamping members are inserted through apertures 26 formed in the frame 11 and through apertures 27 formed in the frame 12, the said apertures 26 and 27 in the frames being of course in alinement so as to receive the clamping members.

While I have shown the device as being employed in connection with angular corners, the apertures through which the glass is exposed may be round or elliptical but I prefer that the seat in which the glass is to be placed be either square or rectangular as that will enable the user to employ stock material which is less expensive than glass which is round or elliptical.

In order to show that the invention contemplates modifications with respect to the opening, I have illustrated the application of the invention to another shape in Figs. 7, 8, and 9.

In the modification, the opening 28 is shown as circular, whereas the opening in the frame 29 is likewise shown as circular, it being understood that the flanges 30 and 31 in this form practically correspond in construction and function with the flanges 17 and 18 heretofore described, and that the ears 32 of the modified construction have the same function as the ears 19ª heretofore described. Furthermore, it will be observed that the clamping members 33 in the modified construction have practically the same function and purpose as the clamping members 25 in the form heretofore described and therefore, it is believed unnecessary to elaborate the description, but it will be understood that instead of having the opening circular, it may be elliptical, triangular, square or rectangular, or that the opening may be alike in the two frames, or the opening in one frame may be square and the opening in the other, which might be regarded as the visual opening, might be round, and, therefore, I do not wish to be limited with respect to the configuration of the openings.

I claim—

1. In a window for vehicle curtains, an inner and an outer frame, the said inner frame having openings for the glass and an outwardly extending flange near its top terminating in a vertically disposed flange, the said outer frame having openings, the edges of which have flanges at an angle to the frame and flanges integral therewith on a plane parallel with the plane of the frame constituting seats for the glass, and clamping members extending through the frames for clamping the curtain therebetween, and drawing the outer frame and curtain under the first mentioned flange of the inner frame.

2. In a window for vehicle curtains, an inner and an outer frame, the said inner frame having openings for the glass and an outwardly extending flange near its top terminating in a vertically disposed flange, the said outer frame having openings, the edges of which have jointless flanges at an angle to the frame and jointless flanges integral therewith on a plane parallel with the plane of the frame constituting seats for the glass, and clamping members extending through the frames for clamping the curtain therebetween, and drawing the outer frame and curtain under the first mentioned flange of the inner frame.

3. In a window for vehicle curtains, an inner and an outer frame, the said inner frame having openings for the glass and an outwardly extending flange near its top terminating in a vertically disposed flange, the said outer frame having openings the edges of which have flanges at an angle to the frame and flanges integral therewith on a plane parallel with the plane of the frame constituting seats for the glass, and ears struck from the first mentioned flanges of the frame and extending therefrom, and clamping members extending through the frames for clamping the curtain therebetween and drawing the outer frame and curtain under the first mentioned flange of the inner frame.

4. In a window for vehicle curtains, an inner and an outer frame, the said inner frame having openings for the glass and an outwardly extending flange at its top, the said outer frame having openings, the edges of which have flanges at an angle to the frame and flanges integral therewith on a plane parallel with the plane of the frame constituting seats for the glass, and clamping members extending through the frames for clamping the curtain therebetween and drawing the outer frame and curtain under the first mentioned flange of the inner frame.

GEORGE N. SHEPARDSON.

Copies of this patent may be obtained for five cents each, by addressing the "Commissioner of Patents, Washington, D. C."